(12) United States Patent
Dowzall et al.

(10) Patent No.: US 6,189,252 B1
(45) Date of Patent: Feb. 20, 2001

(54) PICTURE FRAME CORNER CONNECTING ELEMENT

(75) Inventors: Martin Dowzall, Franklin Lakes; Vazgen Houssian, Union City, both of NJ (US)

(73) Assignee: Nielsen & Bainbridge L.L.C., Paramus, NJ (US)

( * ) Notice: Under 35 U.S.C. 154(b), the term of this patent shall be extended for 0 days.

(21) Appl. No.: 09/368,597

(22) Filed: Aug. 4, 1999

(51) Int. Cl.[7] ........................................ A47G 1/10
(52) U.S. Cl. ................................. 40/783; 403/401
(58) Field of Search ............... 40/782, 783; 403/401

(56) References Cited

U.S. PATENT DOCUMENTS

| | | | |
|---|---|---|---|
| 132,114 | * 10/1872 | Steven | 40/783 |
| 909,080 | * 1/1909 | Goodrow | 403/401 |
| 4,477,990 | * 10/1984 | Buchanan | 40/183 |
| 4,913,579 | * 4/1990 | Campana | 40/782 |
| 4,922,638 | * 5/1990 | Litvak et al. | 40/783 |

* cited by examiner

Primary Examiner—Cassandra Davis
(74) Attorney, Agent, or Firm—Darby & Darby

(57) ABSTRACT

A frame having the appearance of a Hicks frame or moulding is disclosed. The frame comprises four mitred frame elements with grooves cut into the mitred surfaces so that when the frame is assembled, a connector can be inserted into the grooves of adjacent frame elements to hold the frame together. Corner pieces which resemble conventional Hicks type corner pieces hide the junctions between adjacent frame elements. Each corner piece includes a connector which fits into the grooves of two adjacent frame elements to hold the frame together.

4 Claims, 2 Drawing Sheets

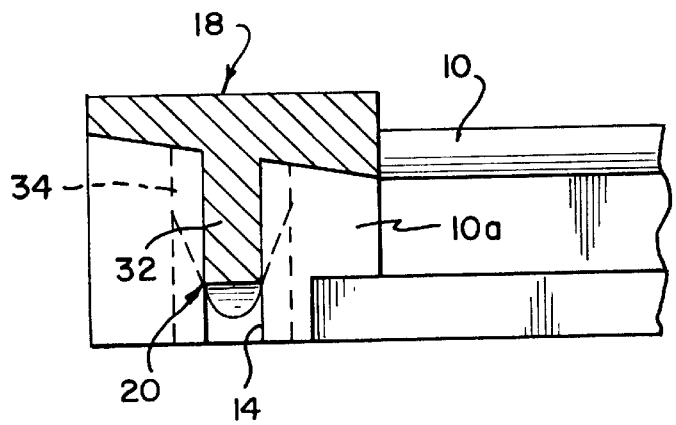
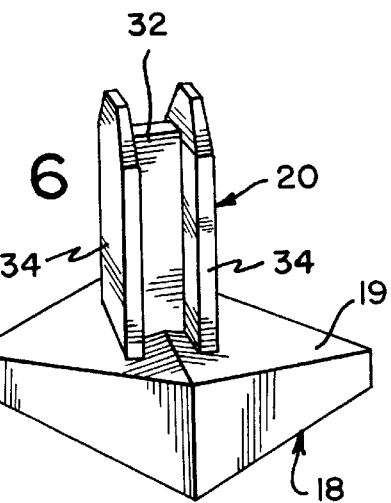
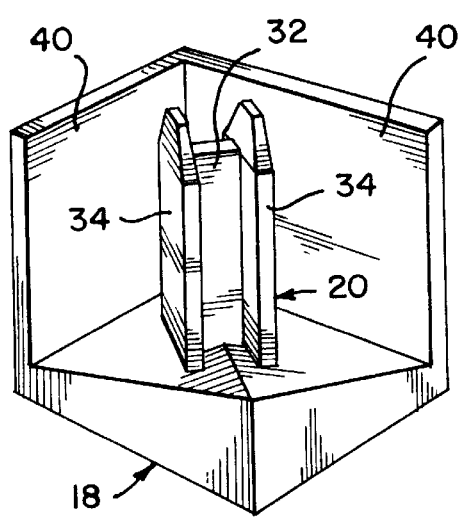
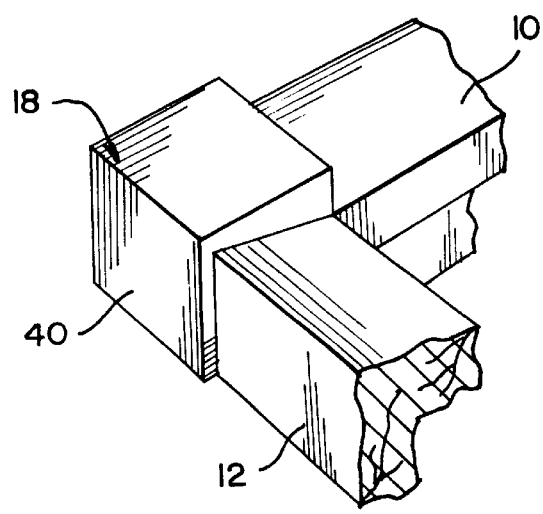

PICTURE FRAME CORNER CONNECTING ELEMENT

FIELD OF THE INVENTION

This invention relates to picture frames and, more particularly, to Hicks type frames.

BACKGROUND OF THE INVENTION

A picture frame, commonly known as a Hicks frame or moulding, is a popular frame, particularly for use with primitive art. In a Hicks frame, individual frame elements are connected at a corner, for example, by means of a lap or tenon joint. A corner block can be adhered to the frame in each corner thereby hiding the joint, or a corner block can be machined to become the junction for the separate legs resulting in an attractive frame with decorative corners.

The present invention provides a picture frame in the Hicks style which can be easily assembled by a framer and which requires no tenon or lap joints.

SUMMARY OF THE INVENTION

In accordance with the invention, a picture frame comprises four framed elements joined together at mitred edges. A connector groove extends across each of the mitred junctions and is accessible from the front of the frame. Corner pieces which simulate the corner pieces used in a Hicks frame are provided at each corner of the frame. Each corner pieces overlies the junction between two adjacent frame elements. In accordance with the invention, each corner piece includes a connector which engages the connecting grooves between adjacent frame elements to secure the frame when the corner piece is secured to the frame.

THE DRAWINGS

FIG. 5 is a sectional line along the line 5—5 of FIG. 3;

FIG. 6 is a perspective view of a corner piece in accordance with the preferred embodiment of the invention;

FIG. 7 is a perspective view of an alternative embodiment in accordance with the invention; and FIG. 8 is a perspective view showing the embodiment of FIG. 7 attached to a frame.

DETAILED DESCRIPTION

Figure 1:
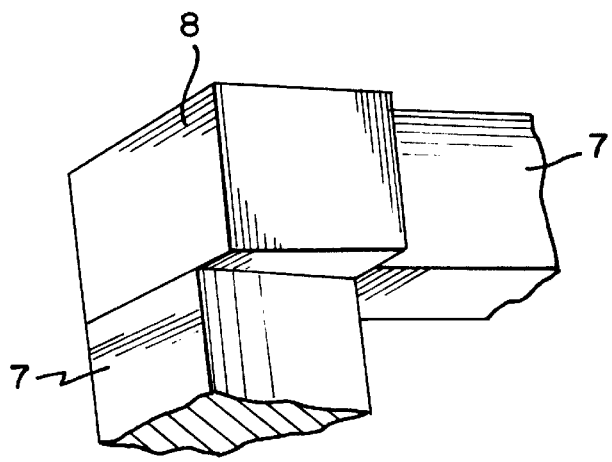
FIG. 1 is a perspective view of a prior art Hicks frame.
Figure 3:
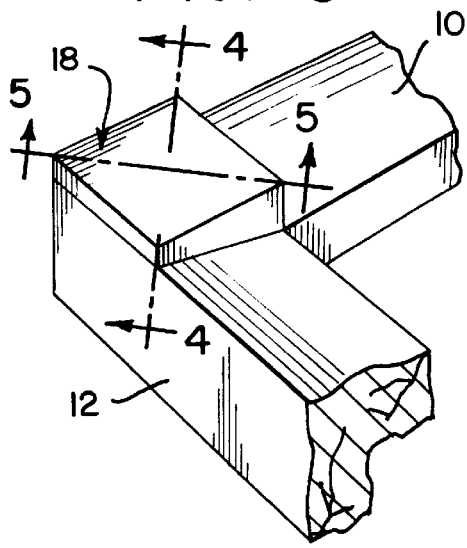
FIG. 3 is a perspective view of the corner of a frame after it has been assembled in accordance with invention.

FIG. 1 shows a conventional Hicks type picture frame or moulding. It comprises frame elements 7 having a decorative corner piece 8 in each corner. The corner piece may be purely decorative or, as mentioned above and as shown in FIG. 1, it may comprise a structural element which receives the properly machined ends of the adjacent frame elements. In either event, when viewed from the front, a decorative square block appears in each corner of the frame.

U.S. Pat. No. 4,742,856 entitled Groove Forming Apparatus And Method discloses a picture frame in which the frame elements are mitred and held in place by means of a connector inserted into grooves cut into the mitred edges of the frame elements. The apparatus for cutting the grooves is also shown in U.S. Pat. No. 4,742,856 which is hereby incorporated by reference into this specification. The connector and cutting apparatus illustrated in the '856 patent are in commercial use and are known as the Thumbnail system.

In the Thumbnail system, the mitred edges of the frame element are aligned and a shaped router bit cuts a T-shaped groove partially through the two aligned frame elements. When the frame is to be assembled, the t-shaped grooves are aligned at the back of the frame and the connector (which is H-shaped in cross-section) inserted into the grooves from the back, with only the mitred junction between the frame elements showing in the front.

In accordance with the preferred embodiment of the invention, the Thumbnail machine as shown in the '856 patent is used to cut a T-shaped groove through the entire frame element. Thus, referring to the drawings, two frame elements 10 and 12 are shown having abutting mitred edges 10A and 12A, respectively. A T-shaped groove 14 is cut into the mitred face 10A of frame element 10 and a similar T-shaped groove 16 is cut into the mitred face 12A of frame element 12. When the mitred ends of the frame elements are joined as illustrated, the two T-shaped grooves 14 and 16 together form an H-shaped groove as shown. Unlike the Thumbnail system shown in the '856 patent, the grooves 14 and 16 extend through the front or forward facing surface of the frame elements 10 and 12. In the preferred embodiment, grooves 14 and 16 extend entirely through the frame elements but it is not necessary that the grooves be accessible from the back of the frame.

In accordance with the invention, a corner piece 18 includes a square plate 19 and an integral connector 20. As shown most clearly in FIG. 6, connector 20 includes a central web 32 which joins two cross pieces 34 so that the connector is H-shaped in horizontal cross-section. Connector 20 is the same as the connector illustrated in the '856 patent; however, in the invention, the connector 20 is formed as a unitary member with the plate 19. For example, the plate 19 and connector may be die cast from zinc.

Figure 2:
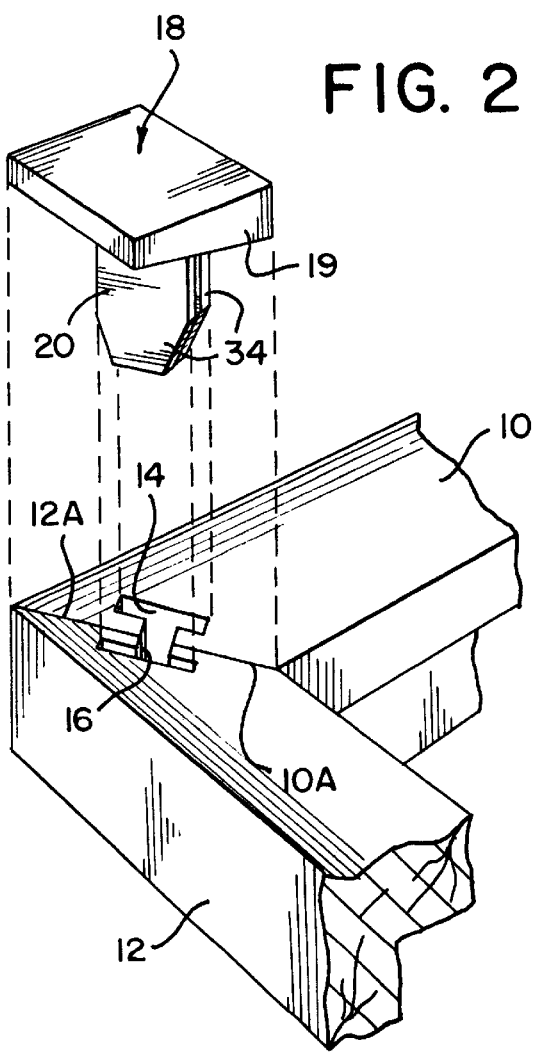
FIG. 2 is an exploded perspective view of the corner of a frame showing how the parts are assembled.
Figure 4:
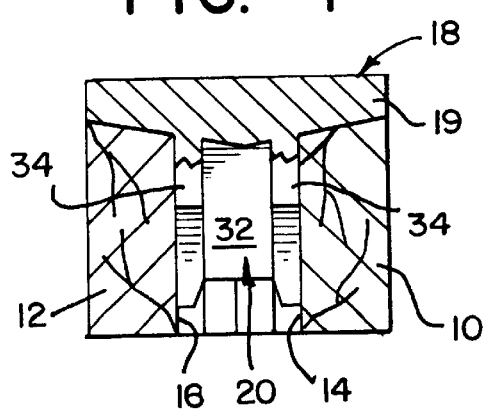
FIG. 4 is a sectional view along the line 4—4 of FIG. 3.

After the mitred edges of the frame elements 10 and 12 have been joined as shown in FIG. 1, the corner piece 18 with the integral connector 20 is inserted into the slots 14 and 16 (FIG. 2) clamping the frame elements together. As shown in the drawings, the dimensions of the square plate 19 correspond to the width of the frame elements. As a result, the square plate covers the junction of the frame elements and simulates the appearance of a Hicks type frame with a corner piece in each corner overlying the joint between adjacent frame elements.

In the illustrated embodiment, for purposes of explanation, the frame elements 10 and 12 are shown with a slight bevel such that when the frame is assembled the inner edge of the frame is slightly lower than the outer edge. To accommodate this shape, the under surface of the corner piece 18 has a complementary shape, i.e., it is beveled in the opposite way so that when the corner piece is inserted, its undersurface, which contacts the outer surfaces of the frame elements 10 and 12, is flush with the contiguous surfaces. If this were not the case, a gap between the undersurface of the corner piece and the frame elements might be visible. In many situations, the frame elements will be flat (i.e. not beveled), in which case the corner piece also would be flat. If the outer surfaces of the frame elements were more complex, for example including curved surfaces, the corner piece would be formed with a complementary surface to provide a flush fit.

In the preferred embodiment, the frame elements 10 and 12 are made from wood and the corner piece 18 is die cast from zinc. The materials, however, form no part of the invention. Instead of making the corner piece and connector as a single unit, the connector 20 can be separately formed and attached to plate 19 by a suitable adhesive. The corner piece, in that instance, can be made of wood or any other desirable material which complements the frame elements 10 and 12.

It is preferred that the grooves 14 and 16 extend through the entire width of the frame elements 10 and 12, respectively. This provides for the possibility of inserting additional connectors from the back of the frame to assist in securing the frame elements together. Furthermore, although the Thumbnail system is preferred, other connector systems with differently shaped grooves and connectors can also be used.

FIGS. 7 and 8 show an alternative embodiment of the invention in which side flanges 40 are provided on the two outer sides of the corner piece which is otherwise the same as the corner piece illustrated in FIGS. 2–6. The side flanges are intended to serve a decorative function.

What is claimed is:

1. A picture frame, comprising four frame elements, each having forward surfaces, side surfaces and mitred edges with adjacent frame elements having abutting mitred edges, a groove cut in each mitred edge of the frame elements, the grooves being accessible from the front of the frame, with the grooves in adjacent mitred surfaces being aligned so as to receive a connector for securing the frame elements together, and a corner piece overlying the mitred joint between adjacent frame elements, said corner piece including a plate having an outer surface and an undersurface, and a connector attached to the undersurface of said plate and which fits into said grooves for holding the frame together, said plate covering the mitred joint and connector, said plate being square with each of its side dimensions approximately equal to the width of one of said frame elements such that one side of the plate is flush with the outer edge of said one frame element and an adjacent side of the plate is flush with the outer edge of an adjacent said frame element.

2. A frame according to claim 1, wherein the forward surfaces of adjacent said frame elements are not parallel and the undersurface of the plate which contacts the frame elements is shaped to fit flush with the outer surfaces of said frame elements.

3. A frame according to claim 1, wherein said plate and connector are formed as a single integral unit.

4. A frame according to claim 1, wherein said corner piece includes side flanges which overlap the side surfaces of adjacent said frame elements.

* * * * *